May 10, 1927. 1,628,530
C. A. BURNETT
METHOD AND MEANS FOR CLEANING OUT PIPE LINES
Filed April 16, 1925  2 Sheets-Sheet 2
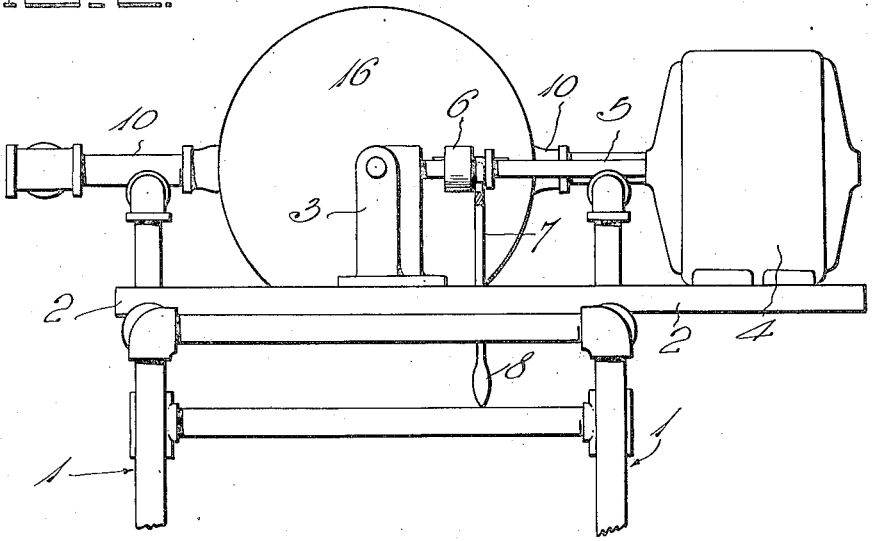
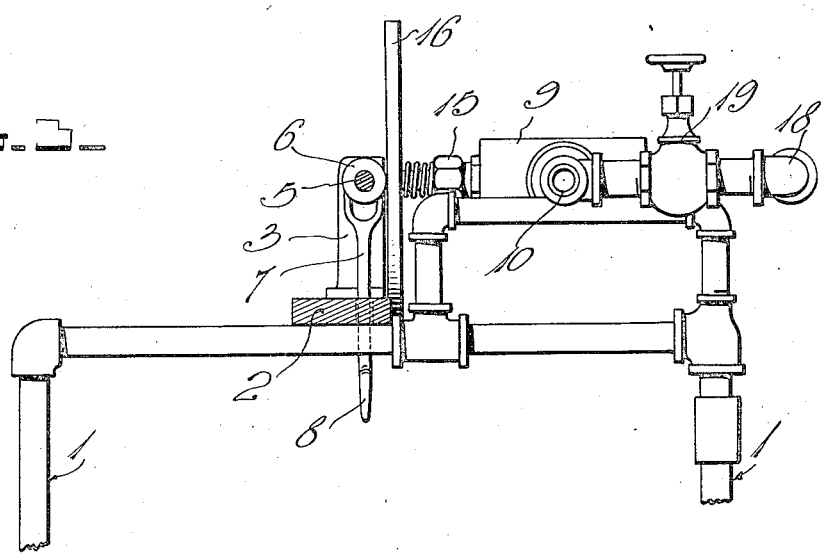
Witness
H. Woodard
Inventor
Charles A. Burnett
By
Attorneys Patented May 10, 1927.

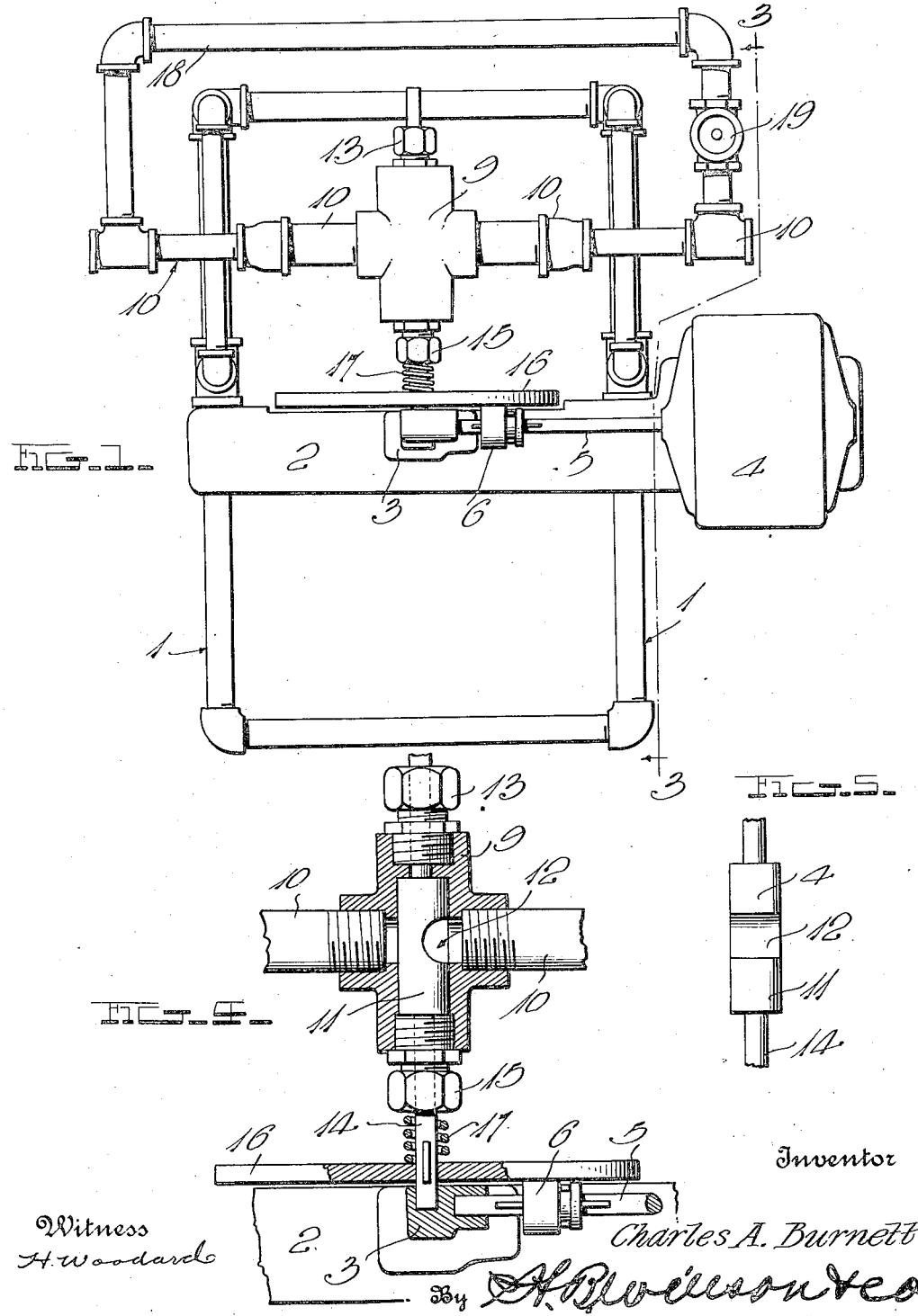

1,628,530

UNITED STATES PATENT OFFICE.

CHARLES A. BURNETT, OF ELKHART, INDIANA.

METHOD AND MEANS FOR CLEANING OUT PIPE LINES.

Application filed April 16, 1925. Serial No. 23,627.

This invention which falls in the art of water distribution is an improved method and means for cleaning out pipe lines, water service systems and the like which have become restricted by sediment, rust, etc., and when the invention is used prior to entire clogging of the pipe, such complete clogging will be prevented and the sediment or the like will be washed out, leaving free passage for the water.

The invention has been devised in order to replace the laborious and expensive methods heretofore used which have included the passage of a wire cable through the pipe line to free the matter clogging the same, and which in some instances, have required digging and disconnection of the house piping from the main.

According to the present invention, the pipe line or the like is cleaned out by alternately opening and closing the line to passage of fluid therethrough. This is done by the use of a device or apparatus which includes a valve and means for alternately opening and closing the valve. The valve, of course, when in use is connected to or in the pipe line.

The invention is hereinafter more fully described with reference to the accompanying drawings which form a part of this specification.

In the drawings:—

Figure 1 is a plan view of an apparatus constructed in accordance with the principles of the present invention;

Figure 2 is an end view of a portion of the apparatus;

Figure 3 is a vertical sectional view of the apparatus taken substantially on the line 3—3 of Fig. 1;

Figure 4 is a horizontal sectional view through the casing of the rotary valve of the apparatus; and Figure 5 is an elevation of the valve itself removed from the casing.

Referring more particularly to the drawings, in which similar reference characters are used to designate corresponding parts throughout the several views, the numeral 1 represents the supporting stand of the apparatus. This stand 1 is preferably made of pipe sections coupled together by elbows or other suitable pipe fittings or couplings, and supports a horizontal board, plate or platform 2. Rising from an intermediate portion of the platform 2 is a bearing 3. Secured to one end portion of the platform 2 which extends beyond one side of the supporting stand 1 is an electric motor 4 or other suitable means for imparting rotary motion. As shown in the drawings, the shaft 5 of this motor 4 extends over the platform 2 and has its free end mounted in the bearing 3, and slidably but non-rotatably mounted upon this shaft 5 is a friction pinion 6. This friction pinion 6 is adjusted along the shaft 5 by means of a lever 7, which of course has connection with the pinion 6 and which is pivoted intermediate of its ends to one edge of the platform 2. The lower end of the lever 7 is formed into a handle 8, by the engagement of which it may be rocked and the pinion 6 may be adjusted.

Mounted upon the supporting stand 1 in any suitable manner is a casing 9. Opposite sides of this casing 9 are provided with pipes 10 or other suitable means adapted for connection to or in a pipe line. In the casing 9 there is rotatably mounted a valve 11. This valve 11 is preferably in the form of a solid cylinder having one side provided with a notch 12 capable of establishing communication between the two sides of the casing 9 and the pipes 10, intermittently as it is rotated. One end of the valve 11 is of reduced diameter and extends through a packing box 13 mounted at one end of the casing 9. The other end of the valve 11 is provided with a stem 14 which extends through a packing gland or bushing 15 provided at the other end of the casing 9. The stem 14 carries adjacent its free end, a disk 16, against one face of which the friction pinion 6 bears. The disk 16 is non-rotatably but slidably mounted upon the valve stem 14 and is yieldably maintained in contact with the pinion 6 by means of a coiled spring 17, this coiled spring 17 bearing against the other side of the disk 16 and the end of the packing gland or bushing 15. The stem 14 has its free end mounted in the aforesaid bearing 3.

The numeral 18 represents a by-pass pipe which extends around the valve casing 9 and has its ends connected to the pipe sections 10. Mounted in this by-pass pipe 18 is a valve 19. The valve 19 provides a means whereby the by-pass pipe 18 may be opened and closed to passage of fluid therethrough. Ordinarily, the agitating valve 11 has only a one-half inch opening and it does not cease to operate even when the by-pass 18 is open. The machine is usually connected to a three-fourth inch pipe and the half inch opening in the agitating valve 11 is not sufficient to allow a full flow of water from the three-fourth inch pipe to carry off all sediment, rust, etc., as rapidly as the machine loosens the same in the piping. Therefore, the purpose of the by-pass 18 is to allow a full flow of water to pass around the agitating valve 11, allowing the sediment, rust, etc., to be carried away as rapidly as the valve 11 loosens the same. I consider this by-pass one of the most essential parts of the invention, as when the sediment and the like breaks loose, it flows with the water in such quantities that the valve 11 would completely clog and the machine be absolutely useless, were it not for such by-pass.

The above described apparatus is used to clean out pipe lines or water service systems in which the size of the water passages have been more or less reduced by sediment, rust, etc. In using it for this purpose, it is only necessary to connect one or the other of the pipe sections 10 to or in the pipe line or service system at a suitable point. For instance, the water meter of the house may be removed and the device may be connected at that point, or it may be attached to any faucet or cock in the system. After it has been attached and the faucets of the system have been opened, it is only necessary to set the motor 4 in operation. The motor will transmit rotary motion to the valve 11 and the latter in rotating, will open and close the pipe line or system to flow of water or fluid therethrough. This intermittent flowing of the water through the system will tend to clean out and flush the matter clogging the same. The speed of the valve may be varied by operating the handle 8. In some cases, it may be desirable to start the valve rotating at its lowest possible speed and to gradually work up or increase the speed of the valve by operating the handle. In other cases, the handle may be operated in such a manner as to alternately increase and decrease the speed of the valve. In either case, the valve will be opened and closed in rather quick succession.

The device has been thoroughly tested and has been found to operate satisfactorily under various conditions, and that in all cases, it has been instrumental in cleaning out partly clogged lines without it being necessary for any digging to be done.

From the foregoing description, taken in connection with the accompanying drawings, the construction, operation and use of the invention will be readily understood, so that further explanation is unnecessary.

Various changes in form, proportion, and the construction and arrangement of these parts may be made without departing from the spirit and principle of the invention and without sacrificing any of the advantages thereof, so that it is to be understood that this may be done within the meaning and scope of the appended claims.

I claim:

1. A method of cleaning a partly clogged liquid pipe of a liquid conducting system without removing said pipe from the system and using only the pressure of the system-contained liquid supplied to said pipe, said method consisting in repeatedly opening and closing the pipe in quick succession to passage of said liquid, the latter being free to enter the pipe under its normal pressure when the pipe is opened to discharge loosened scale and sediment.

2. A method of cleaning a partly clogged liquid pipe of a liquid conducting system without removing said pipe from the system and without the use of pressure other than that of the system-contained liquid supplied to said pipe, said method consisting in repeatedly opening and closing the pipe in quick succession to passage of said liquid under its normal pressure and while the pipe is open to permit discharge of loosened scale and sediment; and by-passing some of the liquid, scale and sediment around the point at which the repeated opening and closing operations are effected.

3. A means for cleaning a partly clogged liquid pipe of a liquid conducting system without removing said pipe from the system and without the use of pressure other than that of the system-contained liquid; said means comprising a valve operatively connected with the partly clogged pipe to either obstruct or permit passage of the system-contained liquid therethrough, means for repeatedly opening and closing said valve in quick succession, and a by-pass around said valve for carrying off some of the liquid and loosened scale, said by-pass having a hand controlled cut-off valve to be closed when starting the pipe cleaning operation.

4. A means for cleaning a partly clogged liquid pipe of a liquid conducting system without removing said pipe from the system and without the use of pressure other than that of the system-contained liquid; said means comprising a stand, a valve casing mounted on said stand and having means at opposite sides for connection with the partly clogged pipe, a rotary valve in said casing for alternately permitting and preventing passage of the system-contained liquid therethrough, a motor mounted on said stand, driving connections between said motor and said valve for rotating the latter to open and close said valve in quick succession, and a by-pass around said valve casing for carrying off some of the liquid and loosened scale, said by-pass having a hand controlled cut-off valve to be closed when starting the pipe cleaning operation.

In testimony whereof I have hereunto affixed my signature.

CHARLES A. BURNETT.